(12) United States Patent
Tarkkala

(10) Patent No.: US 8,117,429 B2
(45) Date of Patent: Feb. 14, 2012

(54) SYSTEM AND METHOD FOR A DISTRIBUTED AND FLEXIBLE CONFIGURATION OF A TCG TPM-BASED LOCAL VERIFIER

(75) Inventor: Lauri Tarkkala, Espoo (FI)

(73) Assignee: Nokia Corporation, Espoo (FI)

( * ) Notice: Subject to any disclaimer, the term of this patent is extended or adjusted under 35 U.S.C. 154(b) by 1409 days.

(21) Appl. No.: 11/591,105

(22) Filed: Nov. 1, 2006

(65) Prior Publication Data

US 2008/0104382 A1 May 1, 2008

(51) Int. Cl.
*G06F 9/00* (2006.01)
*G06F 15/177* (2006.01)

(52) U.S. Cl. ............ 713/2; 713/164; 713/187; 713/189; 726/2; 726/27

(58) Field of Classification Search ........................ 713/2
See application file for complete search history.

(56) References Cited

U.S. PATENT DOCUMENTS

| | | | |
|---|---|---|---|
| 6,263,431 B1 | 7/2001 | Lovelace et al. | |
| 6,978,365 B2 | 12/2005 | England | |
| 7,191,464 B2 * | 3/2007 | Cromer et al. | 726/2 |
| 7,533,274 B2 * | 5/2009 | Freeman et al. | 713/189 |
| 2003/0074548 A1 | 4/2003 | Cromer et al. | |
| 2003/0188113 A1 | 10/2003 | Grawrock et al. | |
| 2003/0229777 A1 | 12/2003 | Morais et al. | |
| 2004/0003288 A1 * | 1/2004 | Wiseman et al. | 713/201 |
| 2005/0283601 A1 * | 12/2005 | Tahan | 713/2 |
| 2006/0015717 A1 | 1/2006 | Liu et al. | |
| 2006/0155988 A1 * | 7/2006 | Hunter et al. | 713/164 |
| 2007/0136577 A1 * | 6/2007 | Bade et al. | 713/164 |
| 2009/0307487 A1 * | 12/2009 | Movva et al. | 713/156 |

OTHER PUBLICATIONS

International Search Report for PCT Patent Application No. PCT/IB2007/054010.

* cited by examiner

*Primary Examiner* — Taghi Arani
*Assistant Examiner* — Narciso Victoria
(74) *Attorney, Agent, or Firm* — Harrington & Smith

(57) ABSTRACT

An improved system and method for efficiently implementing a remotely manageable secure boot on a Trusted Computing Group defined Trusted Platform Module. Various embodiments of the present invention enable a boot process which does not require a dependency on prior RIM certificates, while still requiring a dependency on the sequencing of the boot process.

12 Claims, 4 Drawing Sheets

```
typedef struct RTV_RIM_Certificate_STRUCT {
    TPM_PCR_COMPOSITE state;
    UINT32      authSize;
    [size_is(authSize)] UINT8 authData[];
} RTV_RIM_Certificate;

typedef struct tdTPM_PCR_COMPOSITE {
    TPM_PCR_SELECTION select;
    UINT32 valueSize;
    [size_is(valueSize)] TPM_PCRVALUE pcrValue[];
} TPM_PCR_COMPOSITE;

typedef struct tdTPM_PCR_SELECTION {
    UINT16 sizeofSelect;
    [size_is(sizeOfSelect)] BYTE pcrSelect[];
} TPM_PCR_SELECTION;
```

SYSTEM AND METHOD FOR A DISTRIBUTED AND FLEXIBLE CONFIGURATION OF A TCG TPM-BASED LOCAL VERIFIER

FIELD OF THE INVENTION

The present invention relates generally to the use of remotely manageable secure boot mechanisms in electronic devices. More particularly, the present invention relates to the use of secure boot mechanisms in accordance with the standards promulgated by the Trusted Computing Group.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Trusted Computing Group (TCG) is a group that develops and promotes the use of open, industry standard specifications for trusted computing building blocks and software interfaces across multiple platforms. TCG includes a number of different working groups, including the Mobile Phone Work Group, which is working on the adoption of TCG concepts while addressing specific features which are found in mobile devices.

A TCG Trusted Platform Module (TPM) allows an entity to create measurements of software. A measurement of software is referred to as an integrity metric. A sequence of measurements causes a sequence of these integrity metrics. A single integrity metric or a sequence of integrity metrics can be measured again into another integrity metric. This "measurement" of measurements can be used to determine whether the underlying software stack is valid/authorized or not based on a single metric. In a trusted platform, an operating system kernel uses a configuration file to check the integrity of a module prior to loading and executing. The configuration file includes a hash value (generated by Secure Hash Algorithm-1 (SHA-1)) of the module to be loaded. The hash value is a mathematical value that is used to summarize the contents of the module. The hash value is recorded into one of a plurality of Platform Configuration Registers (PCRs) using a process called extension. This process keeps the size of the PCR constant and represents the sequence of recorded hashes using a single hash. The extension process ensures that the existing content in a PCR is not tampered with. For example, a PCR may contain a value of value1. The size of value1 (in terms of the number of bits) depends on the secure hash algorithm used. The extension process requires that changes to PCR are only performed by calculating the hash value (using a secure hash algorithm, for example SHA1) of the concatenation of the existing value of PCR and the hash value (using the same secure hash algorithm) of a new value. In other words, after the extension process, the PCR would contain SHA1(value1∥SHA1("new value")), assuming that the SHA1 hash function was used. The benefit of this extension process is that, when updating a PCR, it is not feasible to find a value x that, when used to extend a PCR with, would place the PCR in a state that would leave a reader to believe that 'x' would not have been extended or any of the previous extensions would not have been done. In other words, it is not feasible to erase the record of an extension operation or forge an extension operation.

One of the purposes of using trusted platforms is to ensure that untrusted hardware, software and/or software images have not been loaded onto a system. During a boot process, the system compares the values in the PCRs with precalculated values that are known to the system for each device or software. If the values match, then it is known that the device or software is trusted. If the values do not match, then the system knows that there is a trust issue and can take an appropriate action. For example, in the case of an operating system, non-matching values would indicate that a non-authorized operating system, or an unauthorized version of an operating system, is involved and should not be loaded.

Currently, there exists a dependency between two adjacent components in a sequence when their measurements are recorded to a PCR. Basing the authorization of a particular program component on the measurement of the previous component would require knowing the hash values of previously loaded components. Additionally, the update of a single component in the boot chain would require reauthorization of every component following it in the boot chain, with every other Reference Integrity Metric (RIM) certificate having to be updated.

As an example of the above, a boot sequence PCR (for example, PCR3) allocation is conventionally performed according to the PCR3=t(n)=SHA1(t(n−1)∥SHA1("Boot-Event: DM load" name(Cn))). In this example, the name (Cn) denotes the name of the software component Cn, and t(n) denotes the value in PCR3 after the software component Cn is loaded, with t(0) being the initial value of PCR3. In this example, t(n) is dependent on t(n−1). Therefore, if a first component in the boot sequence changes, all remaining RIM certificates must be updated as well. This is not an efficient operation, requiring the use of resources which would otherwise be unnecessary.

In light of the above, it would be desirable to develop an improved system and method for verifying items during a secure boot process. Additionally, it would also be desirable to develop such an improved system that is also remotely manageable. "Remotely manageable" refers to the idea that the entity that is authenticated and authorizes which items are permitted to run on the system is not the local user. In a remotely manageable system, the remote, authorized party is capable of both authorizing items (such as operating system images) to run in the device and to revoke the permissions from previously authorized items. Entities which may be authorized to remotely manage the device include both device manufacturers and service providers.

SUMMARY OF THE INVENTION

The present invention provides for an enabler which can be used to efficiently implement a remotely manageable secure boot interoperable with a TPM Version 1.2. With the present invention, a remote part can be used to authorize certain "measurements of measurements" and store them in a local TPM. Various embodiments of the present invention provide a system and method for implementing an improved and more efficient remotely manageable boot sequence. The present invention involves decoupling the dependency of an authorized measurement on the exact values of any preceding extensions into the same PCR or another PCR. By decoupling these dependencies, a device is no longer forced to recalculate hash values for subsequent items whenever an earlier item in the boot sequence is updated or otherwise altered in some way. Additionally, the various embodiments of the present invention eliminate the need for the device to know previous hash values when authorization is required for an item that is positioned later in the boot sequence. With the various embodiments of the present invention, although there remains a dependency on the extending order of individual PCRs, the dependency on authorization objects (i.e., the RIMs) themselves is eliminated.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide a system and method for implementing an improved and more efficient remotely manageable boot sequence. The present invention involves decoupling the dependencies between two authorized sequential measurements extended into PCRs. By decoupling these dependencies, a device is no longer forced to recalculate hash values for subsequent items when an earlier item in the boot sequence is updated or altered in some way. Additionally, the various embodiments of the present invention eliminate the need for the device to know the exact hash value of previously measured components when authorization is required for an item that is positioned later in the boot sequence.

The following is a discussion of the details involved in a boot sequence according to one embodiment of the present invention. In this example, the code-image of a component "C" is denoted by "<image(C)>". For this same component, the unique name of the component is denoted by "name(C)". In this example, the boot-sequence is defined as a sequence of components C1, C2, C3 . . . that are to be executed by the device in question.

In the following discussion, SHA1 denotes the cryptographic function "Secure Hash Algorithm 1." SHA1 is used as an example of one type of secure hash algorithm that can be used, and it would be understood that any strong cryptographic hash function can be used instead. The string 00..00 is used to denote a bit-string of zeros of the exact length of the output of the cryptographic hash function that is used.

Figure 1:
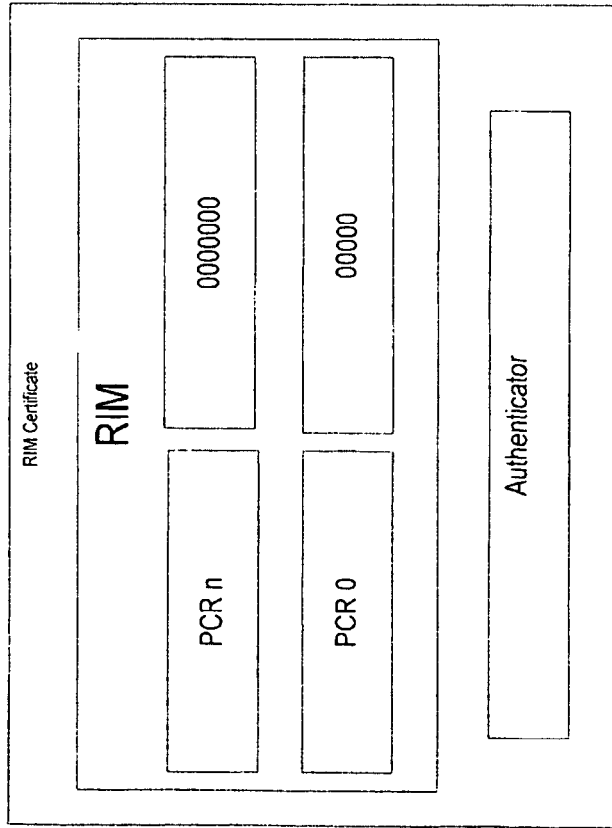
FIG. 1 is a representation of a generic RIM certificate in accordance with embodiments of the present invention.

FIG. 1 depicts a representation of a generic RIM certificate, along with associated computer code. The RIM certificate authorizes a certain extension into "verified PCRs," if those PCRs in a TPM are in a pre-defined state. The RIM certificate authorizes a certain extension into a defined PCR, if the PCRs in a TPM are in a pre-defined state. This extension moves the PCRs from a pre-requisite state to an authorized state. Extending based on a RIM Certificate requires the following steps: First, the cryptographic authentication (i.e., the digital signature or message authentication code) must be checked. If the authentication is valid, then it must be determined whether the PCRs in the TPM are in the prerequisite state in the RIM certificate. If the PCRs in the TPM are in the prerequisite state, then the authorized extension can be performed.

The predefined state and authorized state in a RIM certificate can be described using a single set of PCRs that describes the authorized state. In the scenario described herein, the RIM certificate must be presented together with the extension that is to be authorized, after which it can be determined whether the extension and the current state of the PCRs would result in the authorized state in the RIM certificate. An attempted extension into a verified PCR is only allowed if it is determined that the extension and the current state of the PCRs would result in the authorized state in the RIM certificate.

The predefined state and the authorized state in a RIM certificate can also be described by using a set of PCRs to describe the pre-requisite state and including the authorized extension in the RIM certificate. In this case, only the RIM certificate needs to be presented to perform an authorized extension. When extending to a verified PCR, it can be determined that the attempted extension matches that of the one in the RIM certificate.

In the various embodiments of the present invention, one PCR is reserved so that any assignment to this PCR can be only performed by extension based on a valid RIM certificate authorizing the assignment. In the following discussion below and together with FIG. 2, PCR3 is used as an example of this PCR. It is also understood that it is possible to use other PCRs as PCR3 is used in the examples below. Also, PCR4 and PCR5 are used herein as examples of PCRs that are used to hold hash values of the component image. It is understood that it is possible to use other PCRs as well in the implementation of various embodiments of the present invention.

Figure 2:
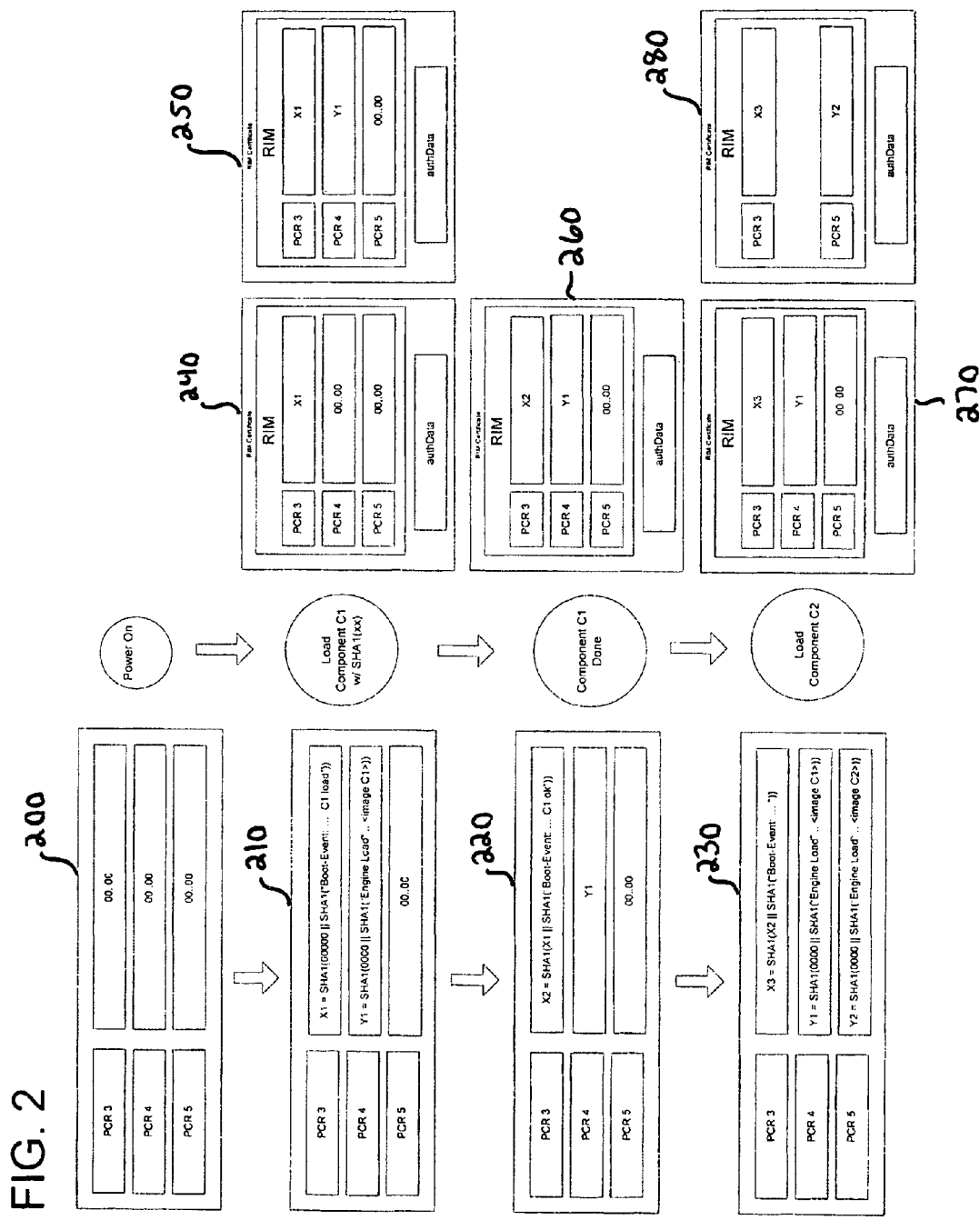
FIG. 2 is a representation of a boot sequence conducted in accordance with one embodiment of the present invention.

FIG. 2 is a representation of a boot sequence conducted in accordance with one embodiment of the present invention. At 200 in FIG. 2, a power on sequence begins. At this point, the device has not calculated any values for the respective PCRs. At 210, component C1 is to be loaded. This value X1=SHA1 (00..00||SHA1("Boot-Event: . . . C1 load")) is extended into verified PCR 3 with the extension authorized using a first RIM certificate 240. the string "Boot-Event: . . . C1 load" is an example of one string that can be used. It would be understood by those skilled in the art that other strings or values can be used. The hash value of the actual image of the component C1 is then extended into PCR4. This is authorized by a second RIM certificate 250 that authorizes the extension of PCR4 to hold the value Y1=SHA1(00..00||SHA1("Engine-Load: DM load"<image C1>)). The string "Engine-Load:DM load" is an example of one string that can be used, although it is understood that other strings or values are also possible. <image C1> denotes the code image of the software component C1. After this, the value X2=SHA1(X1||"Boot-Event DM C1 ok") is extended into PCR3. This is authorized using a third RIM certificate 260. The values in PCR4 and PCR3 must first match the prerequisite state. In this example, this is determined by simulating an extension into PCR3, and then determining whether PCR3 and PCR4 would hold X2 and Y1, respectively. If PCR3 and PCR4 do hold X2 and Y1, the extension into PCR3 is permitted. Otherwise, if PCR3 does not hold X2 or PCR4 does not hold Y1, the extension will not be allowed and the secure boot will result in a failure. If the value in PCR3 is extended, then the end result is shown at 220, where the value in PCR3 is X2=SHA1(X1||SHA1("Boot-Event: DM C1 ok")). Here, the string "Boot-Event:DM C1 ok" is one example of a string that can be used. Other strings and values are also possible.

At 230, the loading of component C2 is initiated. First, PCR3 is extended to hold the value X3=SHA1(X2∥SHA1 ("Boot-Event: DM load C2)) using a fourth RIM certificate 270. The string "Boot-Event:DM load C2" is one example of a string that can be used, and other strings or values are also possible. The value Y1 for PCR4 is still equal to SHA1 (00..00∥SHA1("Engine-Load: DM load" 1<image C1>)) after this extension. Instead, PCR5 is used to extend with a hash containing the image of component C2. This is authorized using a fifth RIM certificate 280. In this case, the value in PCR5 is extended if, and only if, the value in PCR3 is equal to X3 as can be used. Other strings and values are also possible. In this case, even if the value for Y1 changes, the extending of PCR5 can still take place, since this extending is not dependent on Y1. At the same time, however, the boot sequence must still be correct, as the authentication of the individual items are still dependent upon the values of X1, X2, etc. As a result, for example, the component C1 can be updated whenever and however necessary, without having to re-authorize component C2. This is in direct contrast to many conventional systems, where the extending is also value in Y1. In the case where component C1 was updated or altered in some way, this would require that the RIM certificate be updated for component C2. The embodiments of the present invention directly address this issue.

As discussed in the above example, the strings being hashed and extended to PCRs do not need to be exactly as described above. Arbitrary strings can be prefixed and post-fixed to the <image C1>, <image C2>, image(C1), name(C1) etc. strings. The prefixes and postfixes can be empty.

The method described above allows one to describe the pre-requisite states for actual software component loads or executions based on the actual semantics of previously loaded components, and not their exact implementation at the moment. The binding of a certain semantic to an execution or a load of a software image is enforced via RIM certificates that authorize the extension of a certain semantics representation into the verified PCR only if a hash of the corresponding component has been extended also into a PCR.

In the embodiment described above, one PCR is reserved that can be only changed by an extension authorized by the RIM certificate. It is also assumed that, for each software component, a separate PCR is used to hold the hash value of the software component image. Therefore, n+1 PCRs are required if there are n software components. However, it would be understood by one skilled in the art that other embodiments of the present invention are possible. For example, it is possible to implement the secure boot sequence by using only two PCRs: one verified PCR for extending the "measurements of measurements" and one PCR for recording the hashes of components in the boot cycle. The method described previously where n+1 PCRs are used is for illustrative purposes only and is not intended to be limiting.

It should be noted that, in one particular embodiment of the invention, the third RIM certificate 260 may not be necessary to complete the boot process depicted in FIG. 2. However, if the third RIM certificate 260 is not used, then it is necessary for the fourth RIM certificate 270 to contain PCR4. On the other hand, if the third RIM certificate 260 is used, then it is not necessary for the fourth RIM certificate 270 to contain PCR4, as PCR4 is already included in the third RIM certificate 260.

Figure 3:
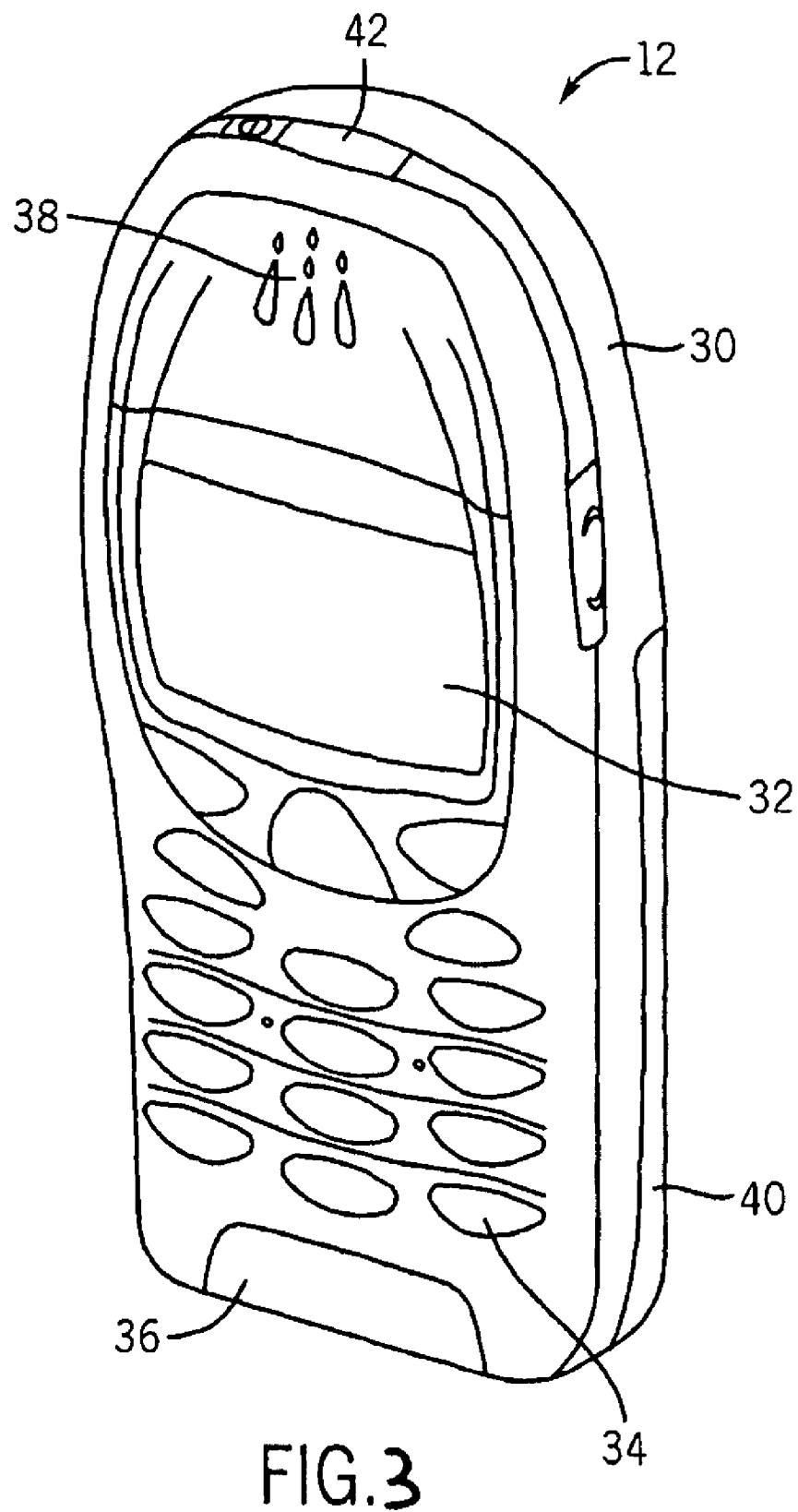
FIG. 3 is a perspective view of a mobile telephone that can be used in the implementation of the present invention.
Figure 4:
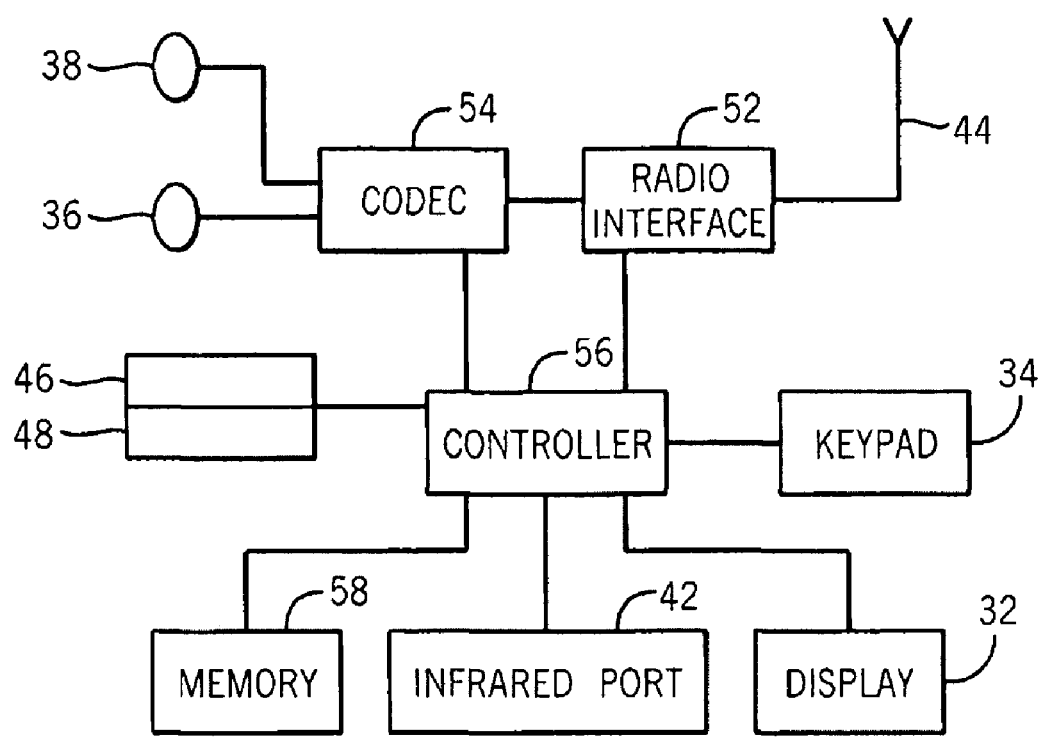
FIG. 4 is a schematic representation of the telephone circuitry of the mobile telephone of FIG. 3.

FIGS. 3 and 4 show one representative electronic device 12 within which the present invention may be implemented. It should be understood, however, that the present invention is not intended to be limited to one particular type of electronic device 12. For example, exemplary communication devices may include, but are not limited to, a mobile telephone, a combination PDA and mobile telephone, a PDA, an integrated messaging device (IMD), a desktop computer, and a notebook computer. The electronic device may be stationary or mobile as when carried by an individual who is moving. The electronic device may also be located in a mode of transportation including, but not limited to, an automobile, a truck, a taxi, a bus, a boat, an airplane, a bicycle, a motorcycle, etc.

The electronic device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   checking, as part of a secure boot process, a first register for a pre-requisite state before loading a component;
   if the pre-requisite state exists in the first register, loading the component;
   updating a second register with a hash value of an image of the component; and
   updating the first register to indicate that the component has been loaded,
   where the first and second registers comprise platform configuration registers (PCRs), where the updating of the first and second registers is performed via an extension process, and where the first register is extendible only by using a valid reference integrity metric (RIM) certificate.

2. The method of claim 1, wherein the extension process comprises a SHA1 algorithm.

3. The method of claim 1, wherein the boot process is remotely manageable.

4. The method of claim 3, wherein the boot process is interoperable with a trusted platform module (TPM).

5. A computer program product comprising:
a nontransitory computer-readable medium having the product embodied therein and also having a memory, said product being configured to load a component in a secure boot process;
computer code for checking a first register for a pre-requisite state before loading the component;
computer code for, if the pre-requisite state exists in the first register, loading the component;
computer code for updating a second register with a hash value of an image of the component; and
computer code for updating the first register to indicate that the component has been loaded;
where the first and second registers comprise platform configuration registers (PCRs), where the updating of the first and second registers are performed via an extension process, and where the first register is extendible only by using a valid reference integrity metric (RIM) certificate.

6. The computer program product of claim 5, wherein the extension process comprises a SHA1 algorithm.

7. The computer program product of claim 5, wherein the boot process is remotely manageable.

8. The computer program product of claim 7, wherein the boot process is interoperable with a trusted platform module (TPM).

9. An apparatus, comprising:
a processor; and
a memory unit being communicatively connected to the processor and including a program for loading a component in a secure boot process, said program having computer code for checking a first register for a pre-requisite state before loading the component;
computer code for, if the pre-requisite state exists in the first register, loading the component;
computer code for updating a second register with a hash value of an image of the component; and
computer code for updating the first register to indicate that the component has been loaded, where the first and second registers comprise platform configuration registers (PCRs), where the updating of the first and second registers are performed via an extension process, and where the first register is extendible only by using a valid reference integrity metric (RIM) certificate.

10. The apparatus of claim 9, wherein the extension process comprises a SHA1 algorithm.

11. The apparatus of claim 9, wherein the boot process is remotely manageable.

12. The apparatus of claim 11, wherein the boot process is interoperable with a trusted platform module (TPM).

* * * * *